United States Patent [19]

Breen et al.

[11] Patent Number: 5,695,854
[45] Date of Patent: Dec. 9, 1997

[54] LIGHT MASK

[75] Inventors: Simon Peter Breen, Bucks; David Dickson, Liverpool; Nigel Ian Barrett, Merseyside, all of United Kingdom

[73] Assignee: Delco Electronics Corporation, Kokomo, Ind.

[21] Appl. No.: 552,331

[22] Filed: Nov. 2, 1995

Related U.S. Application Data

[62] Division of Ser. No. 762,313, Sep. 19, 1991, Pat. No. 5,499,304.

[30] Foreign Application Priority Data

Oct. 2, 1990 [GB] United Kingdom ............... 9021444

[51] Int. Cl.[6] ...................................................... B32B 3/00
[52] U.S. Cl. ......................... 428/195; 428/207; 428/212; 428/218; 428/221; 428/411.1; 428/913; 382/214
[58] Field of Search ............................ 382/214, 212; 345/32, 191; 428/195, 411.1, 913, 207, 212, 218, 221

[56] References Cited

U.S. PATENT DOCUMENTS

| | | | |
|---|---|---|---|
| 3,241,256 | 3/1966 | Viret et al. | 40/130 |
| 3,892,052 | 7/1975 | Wolfgram | 356/121 |
| 4,157,215 | 6/1979 | Hanak | 354/1 |
| 4,206,501 | 6/1980 | Brooks | 362/293 |
| 4,528,596 | 7/1985 | Cope | 358/213 |
| 4,551,762 | 11/1985 | Levine | 358/221 |
| 4,641,353 | 2/1987 | Kobayashi | 382/8 |
| 4,799,791 | 1/1989 | Echizen et al. | 356/121 |
| 4,809,342 | 2/1989 | Kappner | 381/11 |
| 4,843,481 | 6/1989 | Plummber | 358/296 |
| 4,889,425 | 12/1989 | Edwards et al. | 356/152 |
| 4,906,081 | 3/1990 | Yasuda | 350/439 |
| 4,953,100 | 8/1990 | Yotsuya | 364/559 |
| 4,974,261 | 11/1990 | Nakahara et al. | 382/22 |
| 4,975,971 | 12/1990 | Ohnishi | 382/8 |

FOREIGN PATENT DOCUMENTS

| | | | |
|---|---|---|---|
| 0 064 865 A1 | 5/1982 | France | B60K 37/02 |
| 0 221 133 B1 | 4/1986 | France | G02B 27/80 |
| 36891/72 | 8/1972 | Germany | G02B 5/16 |
| 3247 531 A1 | 12/1982 | Germany | G02F 1/133 |
| 88 16 551 | 9/1988 | Germany | G01O 11/22 |
| 53-48175 | 4/1978 | Japan | G01J 1/38 |
| 62-194831 | 4/1987 | Japan | G01J 1/00 |
| 2094996 | 3/1982 | United Kingdom | G02B 5/22 |
| 2121 583 | 12/1982 | United Kingdom | G09F 9/33 |

OTHER PUBLICATIONS

Bruder "Instrumentation for Mapping Light Intensity Contours," IEEE Transactions on Vehicular Technology, vol. VT-19, No. 3, Aug. 1970.

*Primary Examiner*—William Krynski
*Attorney, Agent, or Firm*—Jimmy L. Funke

[57] ABSTRACT

Apparatus for producing a light mask for balancing light across a display area of a vehicle instrument cluster comprises a camera, a digitiser and a computer. An image of the display area is obtained and digitized to produce data relating to the illumination levels of the image at a plurality of pixels. The illumination levels are used to calculate an appropriate light mask for the display area on the basis of the transmissive density of the masking ink used and or a reference illumination value relating to the least lit part of the display area which it is desired to illuminate. The light mask comprises an array of dots having a diameter related to the amount of attenuation required in the area in which the dot is located. Up to three masking layers may be provided if a single layer is insufficient to produce the required attenuation with the chosen masking ink. Balanced coverlays can readily be produced, and the number of masking layers required can also be reduced.

5 Claims, 6 Drawing Sheets

LIGHT MASK

This is a division of application Ser. No. 07/762313 filed on Sep. 19, 1991, now U.S. Pat. No. 5,499,304.

This application corresponds to Great Britain Patent Application No. 9021444.6 filed Oct. 20, 1990.

The present invention relates to an apparatus for producing a light mask for balancing light directed onto a display area of an instrument of, for example, an instrument cluster for a vehicle.

BACKGROUND OF THE INVENTION

Vehicle instrument clusters are normally produced as boxed units having a front panel in which is provided a plurality of apertures for use as display areas, which are associated with the instruments of the cluster. The cluster, in addition to incorporating a plurality of instruments, typically contains one or more printed circuit boards supporting the appropriate electronic circuitry to drive the cluster, a plurality of housings containing the instruments, a plurality of light bulbs for lighting the instrument display areas, and cables and strengthening pillars and the like.

Each display area is normally covered by a coverlay made of transparent or translucent polycarbonate material, which supports a set of graphic symbols pertinent to the particular instrument with which the coverlay is associated. The graphic symbols are printed on the front surface of the coverlay and are formed of a translucent material, whilst the areas of the coverlay not covered by graphic symbols are masked off with an opaque material, for example a black ink.

The graphic symbols are illuminated by the light from the light bulbs inside the instrument cluster shining through the translucent material of the graphic symbols.

A problem encountered with such types of instrument cluster is that the components inside the cluster tend to affect the light reaching the display area, for example by reflecting the light to give bright areas or by obscuring the light to create dark areas. As a consequence, the display area is not evenly lit, resulting in the graphic symbols on the coverlay being illuminated to different extents. It is therefore usually necessary to compensate for the differences in light levels of the graphic symbols by providing a light mask behind the coverlay to dim the over-lit symbols, thereby to balance the intensity levels of all the symbols, and to ensure that the display is of satisfactory quality.

Compensation for such differences in the light levels across each display area is generally carried out subjectively, by determining which graphic symbols are lit more than others, and what level of masking is required to balance the lighting levels. Masking paint, of semi-opaque material, is then applied to the coverlay, behind the appropriate over-lit symbols.

The masking may consist of one or more masking portions having a size and shape suitable for masking the particular graphic symbol with which they are to be associated.

Such compensation is both difficult and time consuming and does not tend to lead to satisfactory results.

SUMMARY OF THE PRESENT INVENTION

The present invention seeks to provide an improved apparatus for producing a light mask for balancing the light transmitted to a display area of an instrument.

The light mask is produced by a method comprising the steps of obtaining an image of an area containing at least part of the display area; defining an array of image areas, each of which image areas comprises part of the obtained image; obtaining at least one illumination value representative of light intensity for each of the image areas; obtaining a reference illumination value; determining an attenuation value for each of the image areas in dependence upon the obtained illumination value or values and the reference illumination value; determining the amount of masking required for each of the image areas on the basis of the determined attenuation value and the type of masking to be used; generating masking data for the production of a light mask on the basis of the amount of masking required for each image area; and producing a light mask from the masking data. The steps may, of course, be carried out in any appropriate order.

The light mask is preferably produced to balance the light across the whole of the display area, and not merely the portions which are to be covered by graphic symbols. This results in the light mask being suitable for many different designs of coverlay, thereby reducing design time and cost.

The method of producing the light mask the method comprises the step of generating for each image area to be attenuated data representative of a region of the image area, and producing masking to cover the region. The region may be substantially in the shape of a disc having a diameter related to the attenuation value for the image area. By varying the size of the region of each image area which is to be masked, a gradual change in masking levels can be obtained. Additionally, appropriate masking for the specific attenuation required can be produced, which, it has been found, can lead to a reduction in the number of masking layers required.

The light mask is produced with a camera for obtaining an image of the display area; image processing means for forming a plurality of image areas, each of which image areas comprises part of the image; evaluating means for obtaining at least one illumination value representative of light intensity for each of the image areas; means for obtaining a reference illumination value; a processor for determining an attenuation value for each of the image areas in dependence upon the obtained illumination value or values and the reference illumination value, and being adapted to determine the amount of masking required for each of the areas on the basis of the attenuation value and the type of masking used, and generating means for generating masking data for the production of a light mask from the masking data.

The present invention is directed to a coverlay for covering the display area of an instrument comprising a substantially transparent or translucent sheet, one or more graphic symbols formed of a translucent material and provided on a first surface of the sheet, a layer of opaque material covering the areas of the sheet not covered by graphic symbols, and at least one layer of masking material, which masking layer is at least partly formed of a plurality of masking dots forming masking with various light attenuating values; the size and spacing of the dots being related to the amount of attenuation required for the area of coverlay in which the dots are located.

BRIEF DESCRIPTION OF THE DRAWINGS

An embodiment of the present invention is described below, by way of illustration only, with reference to the accompanying drawings, in which.

DETAILED DESCRIPTION OF THE INVENTION

In the description, the term ink is used to denote ink or paint or any other suitable substance for providing a coating on a coverlay.

Figure 1:
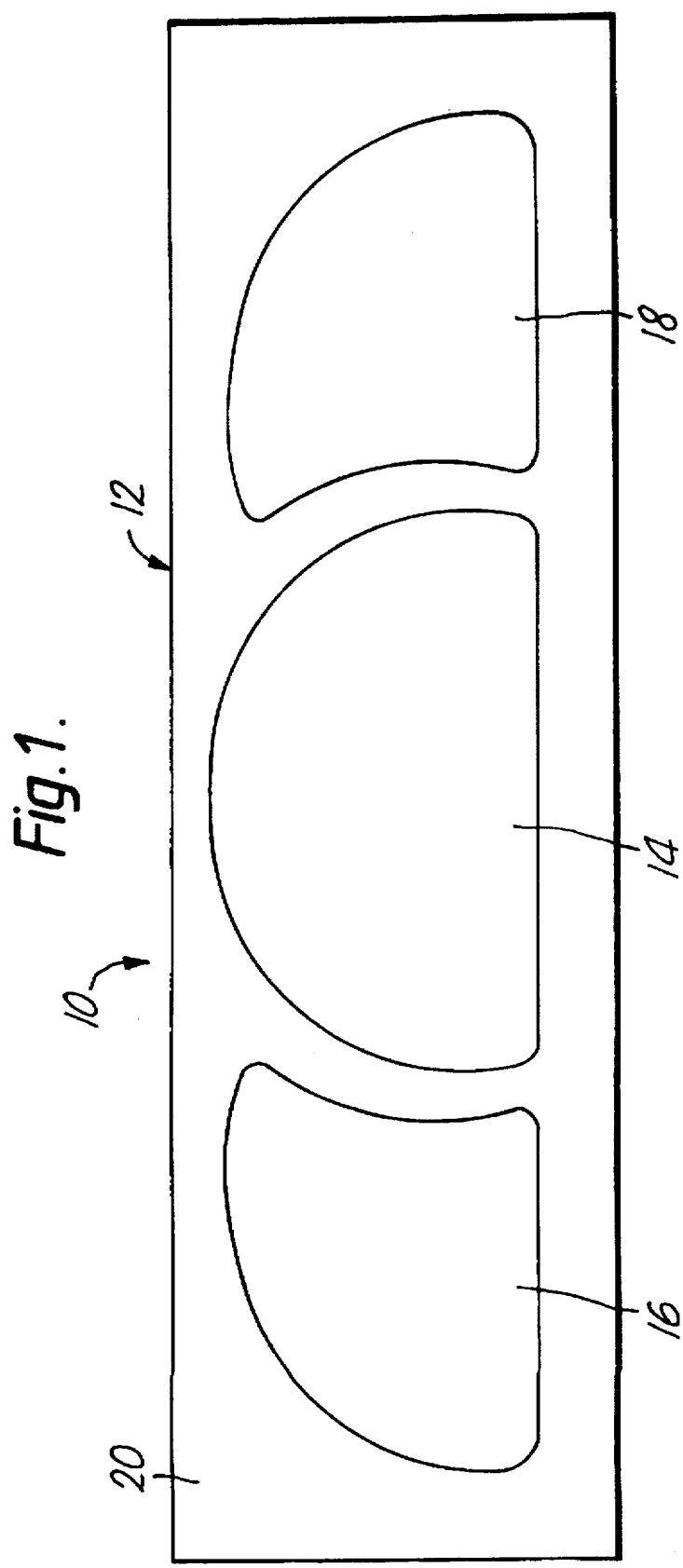
FIG. 1 is a schematic diagram of the front surface of an instrument cluster.

FIG. 1 shows the front face 12 of an instrument cluster 10 for use in a motor vehicle. A plurality of display areas 14,16,18 are defined by the cut-out portions of a shroud 20 located at the front surface 12, such that each display area 14,16,18 is in front of its respective instrument, or instruments for the case where the display area is to serve more than one instrument.

Contained in the instrument cluster, behind the front face 12 and not shown in the Figure, are a plurality of instruments, printed circuit boards, lamps, and other components normally contained in such instrument clusters. The lamps are provided to illuminate the display areas 14,16,18, and thereby to illuminate the graphics of a coverlay associated with each display area, and described in more detail below.

In order to direct sufficient light to all parts of each display area 14,16,18, the instrument cluster 10 also comprises a transparent polycarbonate light guide (not shown) of known form for guiding light to those parts of the display areas normally obscured by the other components in the instrument cluster 10.

Figure 2:
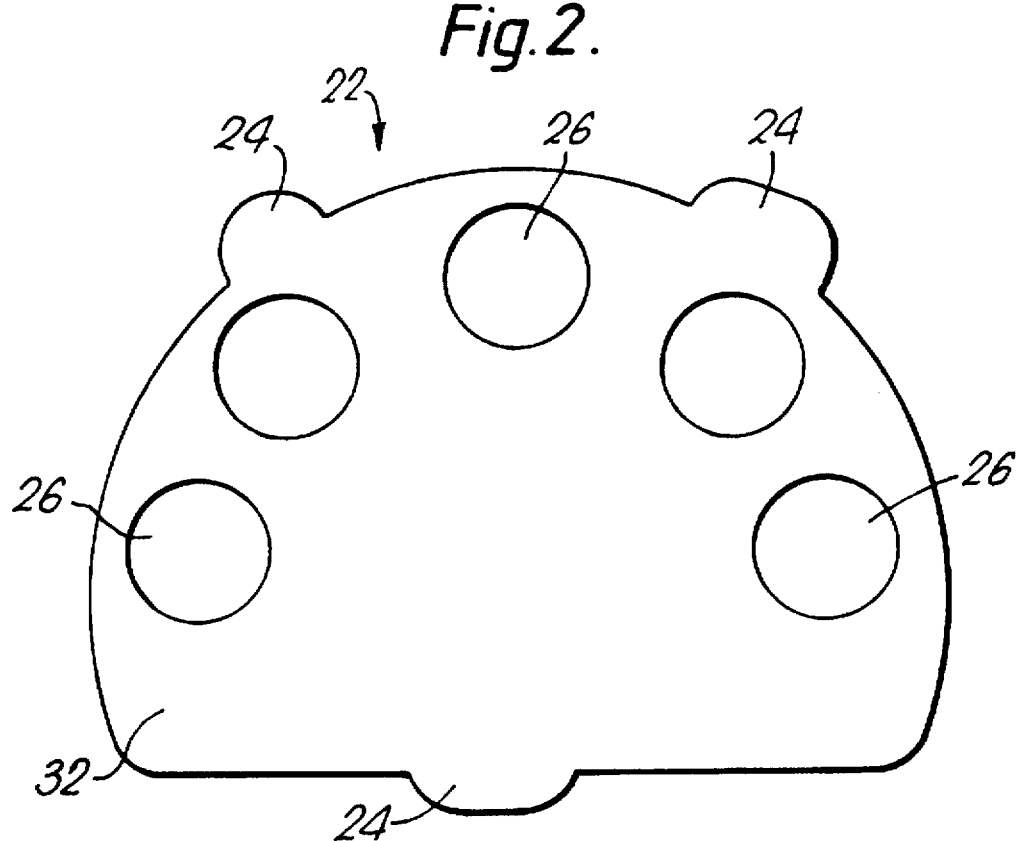
FIG. 2 is a front elevational view of an embodiment of coverlay for use with the instrument cluster of FIG. 1.

FIG. 2 shows a coverlay 22 shaped to fit over the central display area 14 of the instrument cluster 10. It comprises a plurality of graphic symbols 26, represented by a plurality of discs, which may include a scale, such as in a speedometer, one or more symbols indicative of a particular part of the vehicle, a word or words, or any other symbols commonly used with such display areas. The coverlay 22 also includes three tabs 24 of conventional form which fit into matching slots (not shown) in the shroud 20 to fix the coverlay to the shroud.

Figure 3:
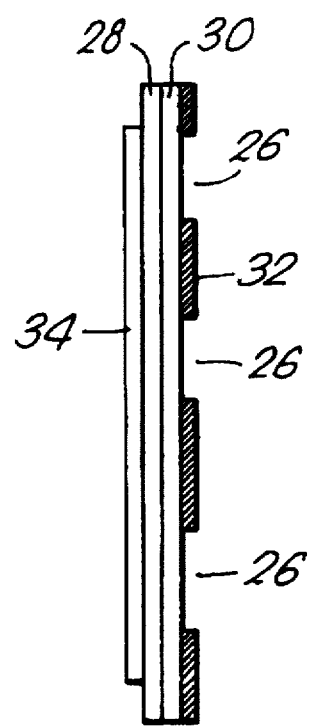
FIG. 3 is an enlarged side elevational view of the coverlay of FIG. 2.

As can be better seen in the side elevational view of FIG. 3, the coverlay 22 is formed of a translucent polycarbonate sheet 28 having a plurality of layers of ink 30,32,34 printed thereon. The first and second layers 30,32 are printed on one side of the sheet 28, while the third layer 34 is printed on the opposite side.

The first layer 30 is a translucent layer of white ink which is provided to diffuse the light slightly, and also to reflect light from the lamps in the instrument cluster 12 back into the cluster, thereby increasing the overall level of light in the cluster.

The second layer 32 is an opaque layer of black ink which masks off all the areas of the coverlay which do not support any graphic symbols 26, thereby preventing light emitted by the lamps from passing though these parts of the coverlay.

The opaque layer 32 is formed of two coats of black ink which, as with the white layer 30, are printed onto the coverlay 22 by any suitable method.

As is evident in FIG. 3, the graphic symbols 26 are formed by appropriately shaped holes in the opaque layer 32 such that light from the lamps can pass through, and thereby illuminate, the graphic symbols 26. Where the graphic symbols 26 are to be colored, an additional region of translucent ink (not shown) of the right color is printed at the position of the hole, in known manner.

The third layer 34 is a light mask which has a pattern designed to attenuate the light at the over-lit parts of the display area 14 so that they are made to match the level of illumination of the least lit parts or a lesser light level. In this manner, the effect which the components inside the cluster 10 have on the distribution of light across the display area 14 can be compensated for, thereby ensuring that all the graphic symbols 26 of the coverlay 22 are lit to the same extent.

Figure 6:
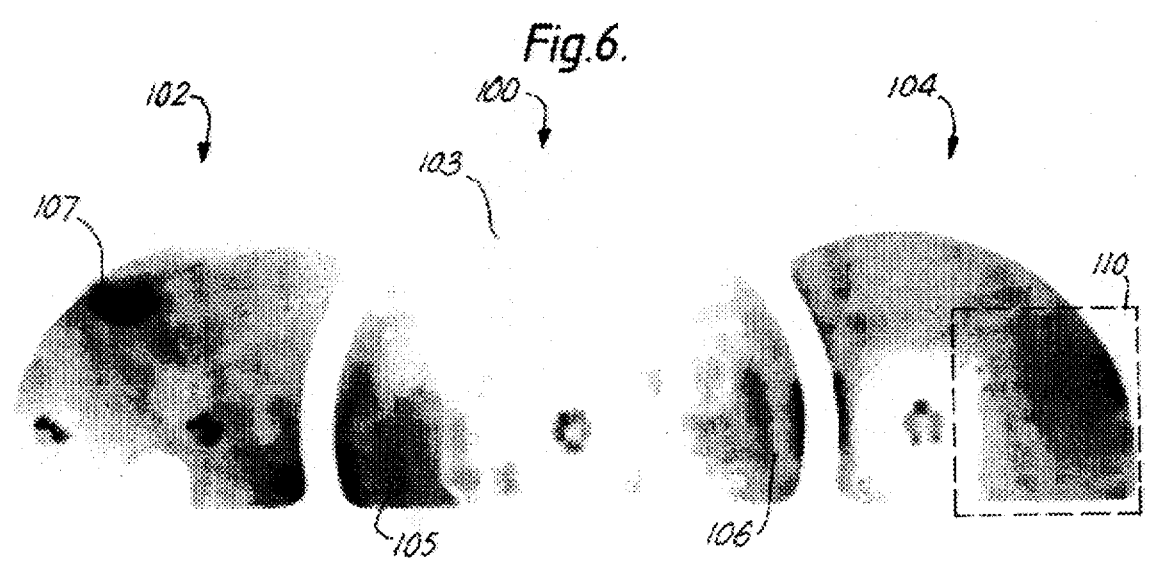
FIG. 6 is a front elevational view of artworks for the production of a light mask.
Figure 7:
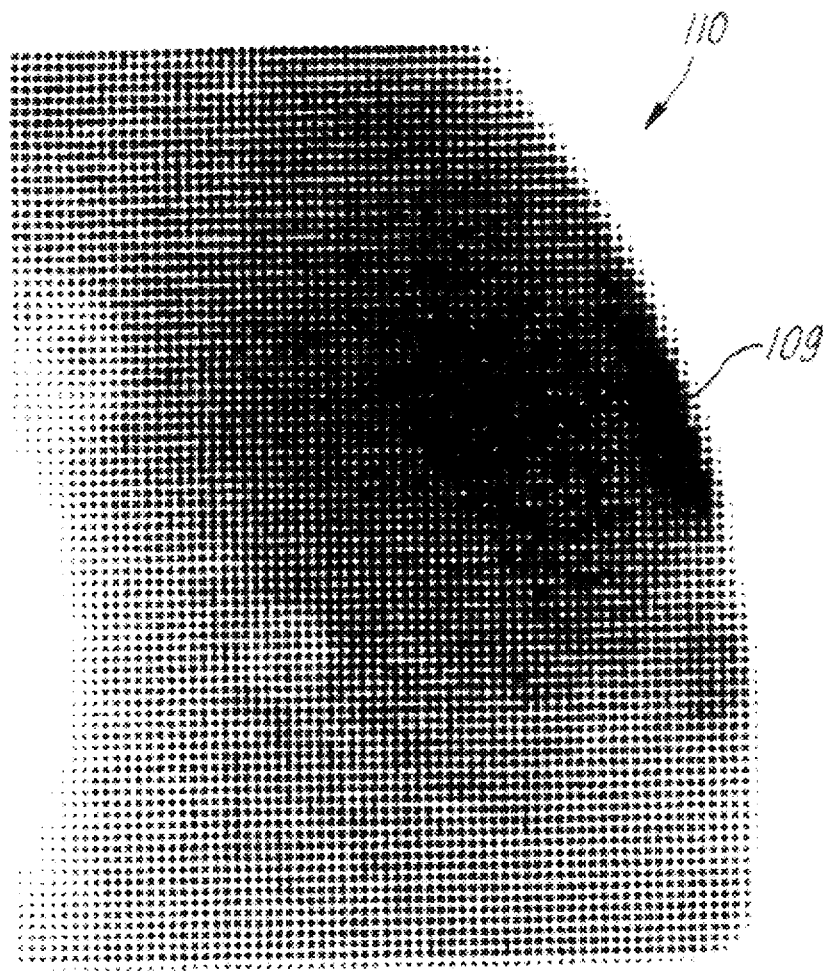
FIG. 7 is an enlarged view of part of an artwork of FIG. 6.
Figure 8:
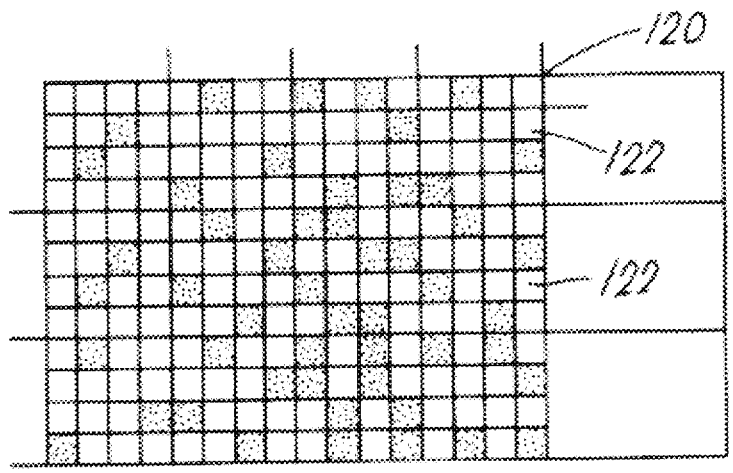
FIG. 8 is a front elevational view of part of a second embodiment of artwork.

As will become apparent from the artworks shown in FIGS. 6 and 7 and the accompanying description, the light mask 34 is composed of one or more layers of dots of masking ink. According to the present invention, and as stated above, the dots form masking with various light attenuating values related to the amount of attenuation required for the area of coverlay in which the dots are located. In one embodiment, the variable light attenuating masking is achieved with dots of different sizes. An example of this embodiment is illustrated in FIGS. 6 and 7, wherein each dot is located in an image area of predetermined size and position in the light mask, arranged in the form of a regular grid, such that their centers are equidistant. Varying degrees of attenuation of each image area are obtained by varying the size of the dot and, when the dot size alone is insufficient to produce the required amount of attenuation, by having two or more layers of masking. These dots may be circular as shown in FIGS. 6 and 7, square as shown in FIG. 8, or of any other suitable shape.

The light mask 34 is screen-printed from a stencil which is produced photographically from artworks of the type shown in FIGS. 6 and 7. Methods such as this are well known and will not be described in detail here. Other layers commonly provided on such coverlays are also not described here.

Figure 4:
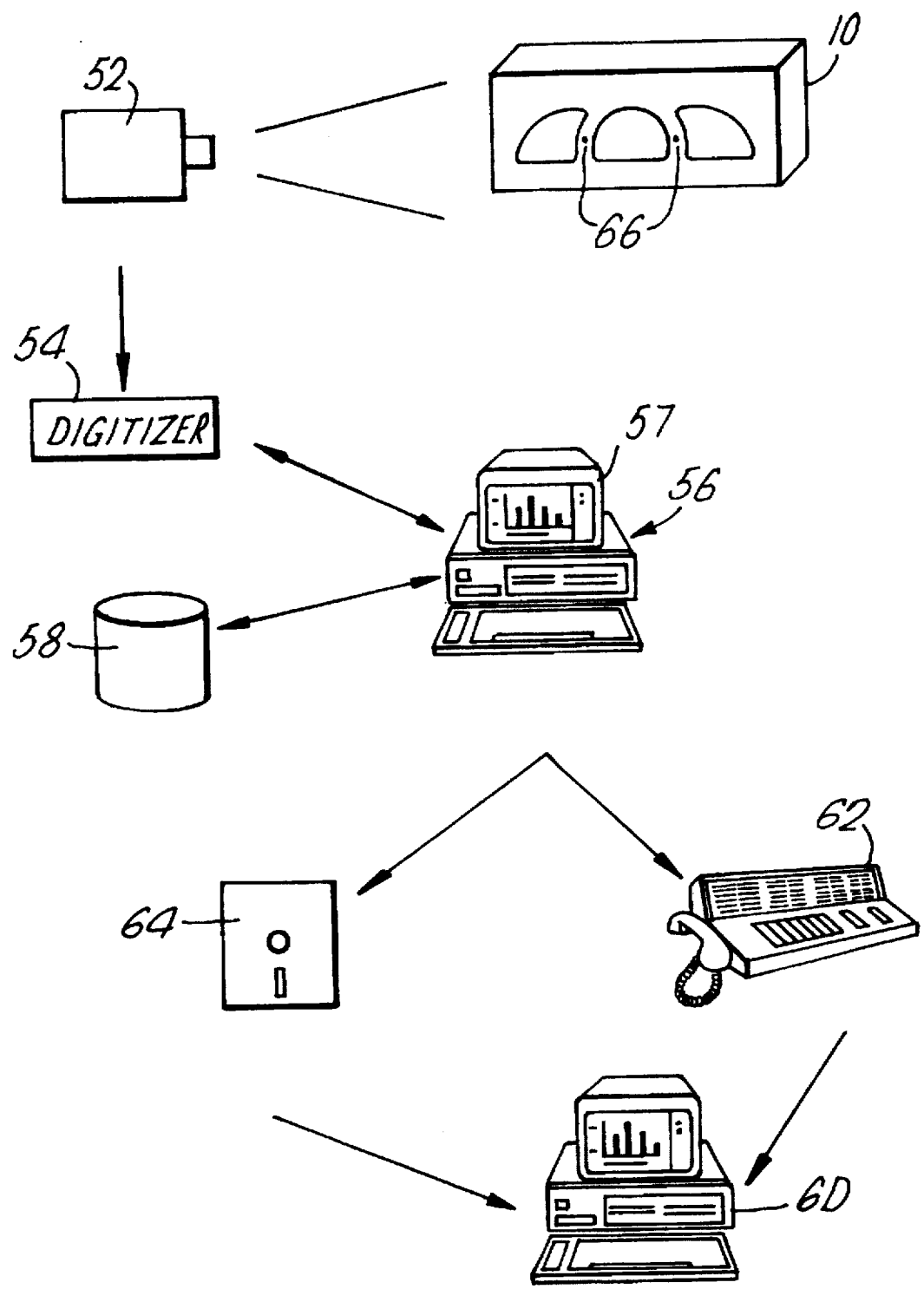
FIG. 4 is a schematic diagram of an embodiment of apparatus for producing a light mask.

An embodiment of apparatus for producing artworks is shown in FIG. 4. It comprises a prototype instrument cluster 10, a camera 52 for receiving an image of the instrument cluster, a digitiser 54 for digitizing the received image, a computer 56 for processing the digitized image and having a monitor 57, and storage memory 58 for storing the processed data. The digitiser 54 is of conventional type and is in the form of an expansion card fitted to the computer 56. A host computer 60 is also provided, which receives the processed data either via a modem link 62 or by means of transportable memory such as a floppy disc 64, and is programmed to create the artworks.

The described embodiment is set up to produce a separate artwork for each display area 14,16,18. Accordingly, the camera 52 is directed at a single display area of the prototype instrument cluster 10 at a time. However, as will become apparent, the apparatus and the process are capable of producing a single artwork covering all the display areas 14,16,18.

To prepare an artwork, two reference points on the prototype cluster 10 are chosen, in this case a pair of holes 66 being drilled in the shroud 20 either side of the display area 14 to allow light from the lamps inside the instrument cluster 10 to pass through them. The holes 66 provide two reference points in the obtained image, the purpose of which will be described below.

A sheet of translucent polycarbonate material, having in this embodiment a white layer such as the layer 30 of the coverlay 22, is then placed over the display area 14 to cause the light directed onto it by the lamps to diffuse slightly, in the same manner as it will be diffused by the sheet 28 of the coverlay 22.

In a darkened room, with the lamps inside the prototype cluster illuminated, the camera is directed and focused onto the central display area 14 such that the image received includes the display area 14 and the two holes 66.

The computer 56 then performs a data processing routine to determine the illumination levels across the display area and to produce masking data for manufacturing a suitable artwork and light mask.

Figure 5:
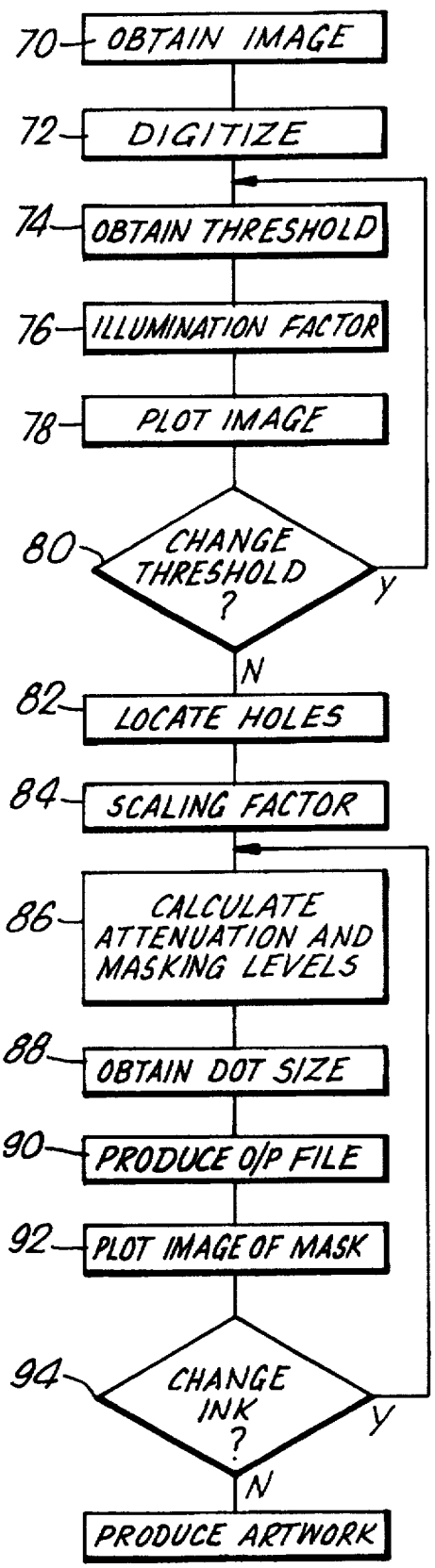
FIG. 5 is a flow chart showing the operation of the apparatus of FIG. 4.

The routine starts, as shown in FIG. 5, at step 70 in which an image of an area including the display area 14 and the holes 66 is obtained, then digitized by the digitiser 54 at step 72, and stored temporarily in memory in the computer 56. The image is digitized in the conventional manner, such that a set of data words is produced, each of which represents a pixel of an array of pixels relating to the image, and comprises coordinates representative of the position of its respective pixel in the array, and an illumination value representative of the light intensity of the image at the position of the pixel.

At step 74, a threshold illumination level is obtained, which in this embodiment, is chosen by the operator. The threshold level is used as a reference value against which the illumination value of each pixel is compared, such that only illumination values above the threshold level are selected for masking. The amount of masking is then determined as a function of the difference between the threshold level and the illumination value, as is described in detail below.

Steps 76 and 78 are provided for showing to the operator the state of illumination of the display area 14 and for helping the operator to ensure that a suitable threshold has been chosen.

At step 76, an illumination factor for each pixel is produced for use in the illumination plot of step 78. The illumination factor is defined as a function of the difference between the illumination value for each pixel and the chosen threshold level; and determines the color by which the pixel will be represented on the computer monitor 57. This color is part of a predetermined sequence of colors, such that each color represents the amount of illumination above the threshold level.

The routine, at step 78, then plots onto the screen of the computer monitor 57 a reproduction of the viewed image showing the illumination levels as a color pattern.

Alongside the reproduction, the routine also plots a key of the sequence of colors with the illumination levels they represent. The operator can then readily locate, from the plotted reproduction, the least lit part of the display area on which there are likely to be graphic symbols; and, from the key, amend the chosen threshold level, if necessary, so that it matches the level of illumination of this least lit part. Thus, the other areas of the display area on which there are to be graphic symbols can be selected for attenuation to match their illumination levels to that of the least lit part.

Step 80 asks the operator whether the operator wishes to repeat step 74 to set a new threshold level, of the one chosen is unsatisfactory.

Once a satisfactory threshold level has been found, the routine moves on to steps 82 and 84, at which it finds a scaling factor used to match the pixels of the image to the image areas used in the artwork and light mask.

At step 82, the operator is prompted to locate in the reproduction plotted at step 78, the images of the two holes 66 drilled into the shroud 20. In this embodiment, this is done by placing a cursor at the positions of the two images in turn, and by then depressing an appropriate key to instruct the routine to read the position of the cursor. The distance between these two positions is then calculated and stored in memory. If the positions of the two images are not in the same horizontal or vertical plane, the routine computes the actual distance between them by using the Pythasareas Theorem.

At another prompt, the operator is requested to input the actual distance between the two holes 66, in millimeters, and the computer then calculates an appropriate scaling factor, at step 84, on the basis of these two values; such that the dimensions of the plotted reproduction and the true dimensions of the display area substantially correspond to one another.

If the calculation determines that the image must be reduced to such an extent that each image area is to be composed of data from a plurality of pixels, then the average of the illumination values for all the pixels in the image area is used in the calculations in step 86. On the other hand, if the calculation determines that the image is to be enlarged to such an extent that the data of one pixel is to be used for more than one predetermined area, then the illumination value of that pixel is used, in step 86, for all of those image areas.

The routine at step 84 will also provide data for the production of two masking dots, each of predetermined size and shape, at the positions of the images formed by the two holes 66 in the shroud 20 for facilitating alignment of the light mask in the instrument panel.

At step 86, the routine calculates for each image area the amount of attenuation and the number of masking levels necessary. The result of this calculation is given by one or more coverage values for each area, which are then used in step 88 to obtain the masking dot sizes.

The calculation at step 86 begins by finding a value of residual intensity on the basis the illumination value calculated at step 84, and the attenuation factor, or Ink_Density of the masking ink, which is entered by the operator. The calculation is as follows:

$$\text{Residual\_Intensity} = \text{Intensity} \times \text{Ink\_Density}^{(\text{No. of Layers})}. \quad (1)$$

Thus, if the layer being processed is the first masking layer, Residual_Intensity will be equal to the intensity value obtained at step 84; but if the layer being processed is the second layer, Residual_Intensity will be equal to the intensity value calculated at step 84 multiplied by the Ink_Density, and so on.

If Residual_Intensity is greater than the threshold value, the following calculations are made.

$$X = 100 - (100 * \text{Threshold}) / \text{Residual\_Intensity} \quad (2)$$
$$\text{Coverage} = (100 * X)/(100 - 100 * \text{Ink\_Density}) \quad (3)$$

where Coverage is a value representative of the percentage of masking required for each image area to produce sufficient attenuation.

A value of Coverage greater than 100 indicates that a single layer of masking ink is not sufficient to produce the necessary attenuation with the Chosen Ink_Density, and that at least one additional layer is therefore required. In the described embodiment, a maximum of three masking layers may be provided, such that if Coverage is still above 100 per cent when the above calculations are made for the third layer, the only way an adequate light mask may be produced is by choosing a darker masking ink to reduce the Residual_Intensity value at each layer.

This calculation is repeated for each image area for which attenuation is to be provided, and the results, that is the value of Coverage and data identifying the respective area, are stored in a respective one of three data files, each relating to one of the three masking layers.

In step 88, in which a dot size is obtained for each predetermined area, the routine accesses a look-up table stored in a memory of the computer 56 to retrieve a dot diameter from the table related to the Coverage value. In this embodiment, a total of 34 different dot sizes are provided, so suitable rounding of the Coverage values is carried out by the routine.

At the same time as the dot sizes are obtained for the image areas, the routine produces, at step 90, an output file for transfer to the host computer 60. The output file consists of a string of records, each of which relates to an area of the artwork, in other words an image area, and contains the coordinates of the area and the dot size. It is produced in a standard format to enable it to be used with standard artwork-producing software. In this embodiment, the Gerber file format is used.

As a final check, at step 92 the routine plots on the computer monitor 57 a representation of the masking layers based on the data in the output file. The operator can then examine the representation to see (i) whether there is a substantial third layer, indicating that there is the possibility that the masking ink is not sufficiently dark for the attenuation to be produced, or that the threshold level chosen is too low; or (ii) whether there is only minimal masking, such as a single layer of masking with substantial areas left unattenuated, indicating that the chosen threshold level is too high and that some areas which eight to be attenuated are being missed.

This final check can, as will be apparent, be carried out automatically by monitoring the values of Coverage for the third masking layer. Any such values above 100 will indicate that even the third masking layer cannot completely attenuate an image area to the required extent.

At step 94, the routine allows the operator to repeat steps 86 to 92 with an ink of different Ink_Density, by amending the appropriate parameters accordingly. In an alternative embodiment, the maximum number of layers can be changed, so that the operator can choose either an ink of higher Ink_Density or more masking layers.

The output data file is stored permanently in any suitable storage memory 58, such as magnetic tape. Additionally, it is transferred to the host computer 60 either by means of a modem link 62, or by means of transportable memory such as a floppy disc 64, or by any other suitable means.

The host 60 is programmed with suitable artwork_producing software, which can either be a program specifically produced for such applications, or any program suitable for producing stencils, both of which are commonly available.

At the host 60, the data in the output file is used to create an artwork which is then used to produce the light masks 34 in known manner. Examples of such artworks can be seen in FIG. 6, which shows an artwork 100 for producing the light mask 34 for the central display area 14, and two other artworks 102,104 for producing light masks for the other two display areas 16,18, respectively.

For the artwork 100, the least lit part of the display area of interest was the upper portion 103, where a graphic symbol 26 is due to be located on the coverlay 22. Therefore, the threshold level was chosen as the illumination level at this portion, and the Coverage and dot sizes calculated on the basis of this. The large area in the center of the display area which has been ignored relates to parts of the display area 14 which have a lower illumination level to the illumination level of the portion 103 but which can be left as they will be obscured by the opaque portion of the coverlay 22. The portions 105 and 106 require a significant amount of attenuation to bring them to the illumination level of the portion 103.

For the artwork 100, a single masking layer 34 will provide the required amount of attenuation. However, the portion 107 of the artwork 102 is completely masked off, indicating that a single layer of masking material is not likely to be sufficient, and in this case a second artwork (not shown) comprising a set of dots at the same position as the portion 107 is needed to produce a second masking layer.

FIG. 7 shows an enlarged view of portion 110 of the artwork 104. The different sizes of dots can clearly be seen in this Figure, which also clearly shows the regular array of dots having their centers equally spaced apart.

Total masking was deemed necessary at portion 109 of the artwork 104, so the dot sizes are chosen at step 88 to be sufficient to fill completely the respective areas in which they are located.

It has been found that use of a grey masking ink provides adequate attenuation for most display areas with a maximum of three masking layers, and has much less effect on different colored graphics than white or black masking ink.

In an alternative embodiment, the dots used in preparing the artwork are kept a constant size, while the spacing, or pitch of the dots is changed to alter the amount of masking to be provided, and thereby the attenuation to be produced.

The routine described above is substantially the same for this embodiment. For example, calculation steps 1, 2 and 3 to calculate the amount of Coverage required are also carried out with this embodiment. The principal changes are (i) to the look-up table associated with the Coverage values, which will give values related to pitch, or spacing to be provided between dots; and, possibly, (ii) to the calculation of an attenuation value for the image area in step 86 which will have to take into account movement of the image area due to movement and positioning of adjacent dots.

In a preferred arrangement for this alternative, step (ii) above is dispensed with. This is achieved by defining image areas and dot sizes in such a manner that a plurality of dots is required to mask off an image area completely, and such that when less than complete masking is required, only some of the masking dots are provided, at predetermined spacings in the image area. The image areas are given predefined positions, as with the image areas of the first-described embodiment, with masking being provided for each individual image area by masking dots spaced from one another by appropriate amounts.

This feature is illustrated in FIG. 8. As can be seem, each image area 120 is formed of a two-dimensional array of sub-areas 122 representative of the area covered by one of the masking dots. The system calculates the average illumination value as for the first described embodiment, and the dot spacing from this value. As will be apparent, in this embodiment there is a predetermined number of possible spacings, which in practice significantly eases processing of the data.

Of course, it is not necessary for the dots to be square. They could be circular as with the first-described embodiment, or of any other suitable shape.

In order to increase the maximum attenuation possible with a fixed number of masking layers, the second and third layers can be made of darker ink than the first layer. Light passing through the second and third layers will be diffused through the first layer, thereby eliminating any sharp changes in light intensity which may otherwise be present at the edges of the masking dots of these layers. Progressively darker inks may be used for the second and third layers.

Additionally, use of a CCD camera having a pick-up element formed of an array of charge-coupled devices adapted to pick-up color as well as intensity can enable the apparatus and routine to account for the color of the light in the display area. As will be apparent from the above, such a routine would carry out similar calculations to the odes used with the illumination values to produce the required color compensation.

The embodiments of the invention in which an exclusive property or privilege is claimed are defined as follows:

1. A coverlay for covering the display area of an instrument comprising a substantially transparent or translucent sheet, one or more graphic symbols provided on a first surface of the sheet, a discontinuous layer of opaque material covering areas of the sheet on which the graphic symbols are not provided, and at least one discontinuous layer of masking ink covering areas of the sheet on which the graphic symbols are provided, which masking ink is at least partly formed of a plurality of masking dots having different spacing between one another, the mount of spacing between each masking dot being related to a desired amount of attenuation for the area of coverlay at which the dot is located.

2. A coverlay according to claim 1, wherein the discontinuous layer of opaque material is provided on the first surface of the sheet.

3. A coverlay according to claim 1, wherein each discontinuous layer of masking ink is provided on a surface of the sheet opposite to the first surface.

4. A coverlay according to claim 1, comprising a continuous layer of light colored material on the first surface of the sheet, such that the discontinuous layer of opaque material and the graphic symbols are provided on the continuous layer of light colored material.

5. A coverlay according to claim 1, wherein the dots are grey in color.

* * * * *